United States Patent
Brandner et al.

(10) Patent No.: US 9,680,163 B2
(45) Date of Patent: Jun. 13, 2017

(54) FUEL CELL AND METHOD FOR PRODUCTION THEREOF

(75) Inventors: Marco Brandner, Höfen (AT);
Thomas Franco, Hüttlingen (DE);
Georg Kunschert, Pflach (AT);
Reinhold Zach, Reutte (AT); Gebhard Zobl, Schattwald (AT)

(73) Assignee: PLANSEE SE, Osterreich (AT)

( * ) Notice: Subject to any disclaimer, the term of this patent is extended or adjusted under 35 U.S.C. 154(b) by 389 days.

(21) Appl. No.: 12/668,963

(22) PCT Filed: May 6, 2008

(86) PCT No.: PCT/EP2008/003630
§ 371 (c)(1),
(2), (4) Date: Feb. 24, 2010

(87) PCT Pub. No.: WO2009/012829
PCT Pub. Date: Jan. 29, 2009

(65) Prior Publication Data
US 2010/0173217 A1    Jul. 8, 2010

(30) Foreign Application Priority Data
Jul. 26, 2007 (DE) .................. 10 2007 034 967

(51) Int. Cl.
*H01M 8/24* (2016.01)
*H01M 8/0247* (2016.01)
*H01M 8/0202* (2016.01)
*H01M 8/0232* (2016.01)
*H01M 8/2425* (2016.01)
*H01M 8/124* (2016.01)

(52) U.S. Cl.
CPC ....... *H01M 8/0247* (2013.01); *H01M 8/0202* (2013.01); *H01M 8/0232* (2013.01); *H01M 8/2425* (2013.01); *H01M 2008/1293* (2013.01); *Y02P 70/56* (2015.11)

(58) Field of Classification Search
USPC .................................... 429/400–525
See application file for complete search history.

(56) References Cited

U.S. PATENT DOCUMENTS 3,589,942 A * 6/1971 Leitz et al. ................... 429/518
4,365,008 A    12/1982 DeCasperis et al.
(Continued)

FOREIGN PATENT DOCUMENTS

AT    008 975    3/2007
EP    1 278 259   1/2003
(Continued)

OTHER PUBLICATIONS

International Search Report for International Application No. PCT/EP2008/003630.
(Continued)

*Primary Examiner* — Christopher Schatz
(74) *Attorney, Agent, or Firm* — Richard M. Klein; Fay Sharpe LLP

(57) ABSTRACT

A fuel cell (1) has a plate (2) produced by powder metallurgy which comprises in one piece a porous substrate area (4) to which the electrochemically active cell layers (6) are applied, and a gastight edge area (5) which is provided with gas passages (17, 18).

9 Claims, 2 Drawing Sheets

(56) References Cited

U.S. PATENT DOCUMENTS

Figure 1:
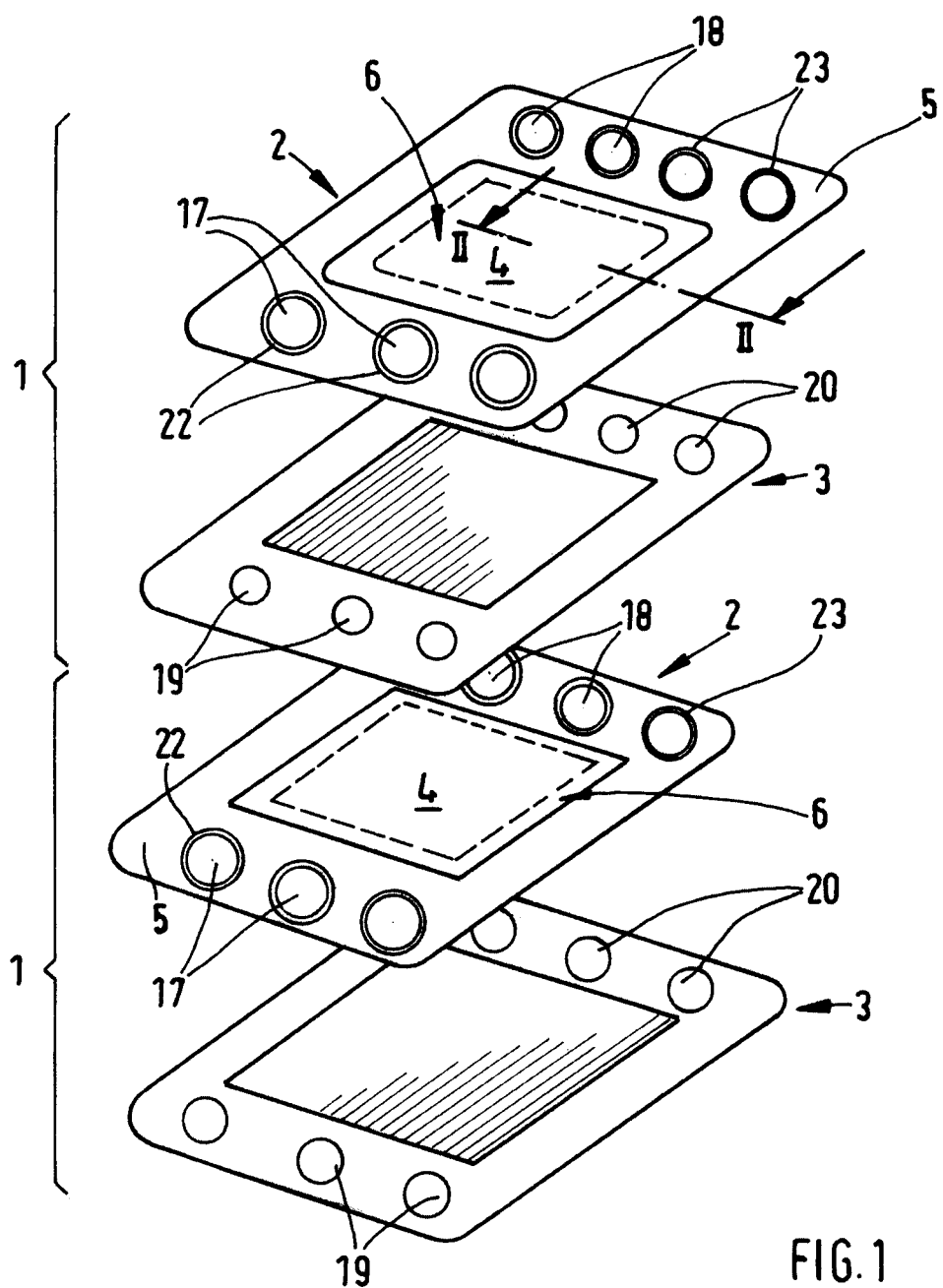

| | | | |
|---|---|---|---|
| 4,579,788 A * | 4/1986 | Marianowski et al. | 429/508 |
| 2002/0048699 A1 | 4/2002 | Steele et al. | |
| 2003/0031915 A1* | 2/2003 | Diez et al. | 429/38 |
| 2003/0148160 A1* | 8/2003 | Song | H01M 8/1213 |
| | | | 429/466 |
| 2005/0142426 A1 | 6/2005 | Danzer et al. | |
| 2005/0175884 A1 | 8/2005 | Danzer et al. | |
| 2009/0042080 A1* | 2/2009 | Glatz | B22F 3/11 |
| | | | 429/469 |

FOREIGN PATENT DOCUMENTS

| | | |
|---|---|---|
| EP | 1 318 560 | 7/2007 |
| GB | 2 400 723 | 10/2004 |
| GB | 2 420 440 | 5/2006 |
| GB | 2 422 479 | 7/2006 |
| JP | 10-513006 | 12/1998 |
| JP | 11-195422 | 7/1999 |
| JP | 2003-100323 | 4/2003 |
| JP | 2005-032546 | 2/2005 |
| JP | 2008-513938 | 5/2008 |
| JP | 2010-055812 | 3/2010 |
| WO | WO 02/35628 | 5/2002 |
| WO | WO 02/101859 | 12/2002 |
| WO | WO 2004/030133 | 4/2004 |
| WO | WO 2004/059765 | 7/2004 |
| WO | WO 2006/136257 | 12/2006 |
| WO | WO 2006/138257 | 12/2006 |
| WO | WO 2008/138824 A1 | 11/2008 |

OTHER PUBLICATIONS

English Translation of WO 20008/138824 A1, Published Nov. 28, 2008.

* cited by examiner

FUEL CELL AND METHOD FOR PRODUCTION THEREOF

This invention relates to a fuel cell having a porous substrate produced by powder metallurgy to which the electrochemically active cell layers are applied and which is disposed in the central area of a plate with gas passages provided in the edge area thereof. It also relates to a method for producing the fuel cell.

Among the various types of fuel cell, the high temperature fuel cell or solid oxide fuel cell (SOFC) is emerging as particularly suitable on account of its high electrical efficiency and the possible utilization of the waste heat arising in the high temperature range e.g. for stationary cogeneration. It is thus possible to obtain electrical efficiencies of 60% to 70% in hybrid systems in which the SOFC is integrated into gas turbine processes. But also for mobile applications, for example for supplying onboard electrical systems (APU—auxiliary power unit) in trucks or cars, SOFC systems are of great interest. They offer the potential of an efficient and thus fuel-economizing power supply, whereby both conventional fuels (gasoline, diesel, natural gas) and pure hydrogen can be employed.

While the tubular design is particularly suitable for stationary power plant applications, the planar SOFC offers advantages for decentralized stationary and mobile application because of the shorter current conducting paths and thus higher areal power density.

The latest generation of SOFCs has a porous metallic body which performs as a substrate the support function for the electrode layers and the electrolyte layer (metal-supported cell, MSC). The MSC is of interest in particular for mobile applications because it possesses better thermal cyclability, high mechanical loading capacity and high reoxidation stability at a low cost of materials and small cell thickness. In addition, the integration of an MSC into a fuel stack can be realized by commercially available soldering and welding processes.

For the substrate it is customary to employ high-alloy chromium steel. The substrates employed are in particular porous bodies produced by powder metallurgy (AT 008975 U1), woven or knitted fabrics (EP 1 318 560 A2, WO 02/101859 A2), perforated sheet metal or expanded metal US 2005/142426 A1, GB 2400723 A, GB 2422479 A). In a planar SOFC the substrate can be welded into a sheet metal frame produced by fusion metallurgy and having the gas passages, e.g. the fuel gas and waste gas openings for fuel gas supply and waste gas removal to and from the fuel cell. Thus there is formed a plate with the gas passages or manifold in the edge area. The mutual sealing of the anode-side and cathode-side gas space is effected via the gastight electrolyte which extends from the porous substrate area beyond the weld seam onto the sheet metal frame (EP 1 278 259 A2).

The substrate can be perforated sheet metal (WO 02/35628 A1), or a body produced by powder metallurgy (EP 1278259 A2).

The disadvantage of the perforated plates lies primarily in their poor coatability with a fine-structured anode, but also in an irregular gas distribution to the anode. According to US 2005/0175884 A1 it is hence proposed to provide the holes in the metal plate at an angle. However, this is difficult and cost-intensive. According to WO 2004/059765 A2 a filling of the holes of the plate with anode material is proposed to improve the coatability of the substrate. However, it has been found that all holes must be filled without error to guarantee the necessary process reliability. According to WO 2006/138257 A1 there is proposed a fine-structured transition element, e.g. a nickel mesh, between the perforated plate and the anode coating, but this involves additional costs.

Compared to perforated sheet metal, porous substrates produced by powder metallurgy offer better coatability and gas distribution. To connect the porous substrate gastightly to the sheet metal frame, the edge of the substrate is compressed to be gastight, according to EP 1 278 259 A2, before it is welded to the sheet metal frame to form the plate. However, the integration of the porous substrate with the sheet metal frame causes microstructurally different, often also different alloys, to be interconnected. For thermomechanical reasons this state is undesirable, because high tensions can be induced into the cell sandwich. Further, the circumferentially formed weld seam between the sheet metal frame and the substrate leads to warpage of the plate. Also, the weld seam itself involves the risk of defects, which would mean a leakage path between anode side and cathode side. Moreover, the substrate welded into a sheet metal frame leads to a high cost of materials, because a high proportion of the sheet metal becomes waste material upon cutting of the frame.

The object of the invention is hence to provide a fuel cell which guarantees a reliable-process coating with anode, electrolyte and cathode and at the same time a suitable basis for the stack integration of the cell at low material usage.

This is achieved according to the invention by a one-pieced plate produced by powder metallurgy whose central area is of porous configuration to form the substrate, and whose edge area having the gas passages or the "manifold" is compressed to be gastight.

For producing the plate of the inventive SOFC there is first produced a planar, powder-metallurgical, porous body which preferably consists of an iron-chromium alloy. The body can be produced here according to AT 008 975 U1.

That is, it can consist of an alloy comprising
15 to 35 wt. % Cr;
0.01 to 2 wt. % one or more elements of the group Ti, Zr, Hf, Mn, Y, Sc, rare earth metals;
0 to 10 wt. % Mo and/or Al; 0 to 5 wt. % one or more metals of the group Ni, W, Nb, Ta;
0.1 to 1 wt. % O;
balance Fe and impurities, whereby at least one metal of the group Y, Sc, rare earth metals and at least one metal of the group Cr, Ti, Al, Mn can form a mixed oxide.

The selection of the powder fraction for the body must be made in such a way that defects in the surface which naturally result from deviations from an optimal packing density are kept small enough to guarantee good coatability. For forming the planar, powder-metallurgical, porous body there is preferably employed a powder fraction with a particle size of <150 µm, in particular <100 µm. The use of finer powder fractions would improve coatability further, but entail a worsening of the high temperature oxidation stability on account of a higher internal surface.

From powder and a binding agent there is produced a planar green body with a thickness of preferably 0.3 to 1.5 mm. After the debindering of the green body the body is sintered, whereby it has a porosity of preferably 20 to 60%, in particular 40 to 50%, after sintering. The porosity is the density of the porous body based on the density of the alloy.

Subsequently, the edge area of the porous body is compressed until it is gastight. The dimensions of the compressed edge area result from the necessary surface area for the gas passages and sealing surfaces, in particular with the electrolyte layer and the contact plate, as to be explained more closely hereinafter. The contact plate is often also designated an interconnector and is hence to be understood as such.

The compression of the body in the edge area can be effected by uniaxial pressing or section rolling. The transition between the central porous substrate area of the plate and the compressed edge area can be configured as a step. However, there is preferably produced upon compression a continuous, stepless transition between the substrate area and the compressed edge area, because edges and similar discontinuities can cause tensions in the plate. To obtain a tension release in the structure of the plate after the compression process, there can optionally be added an annealing or similar heat treatment.

Subsequently, the tight edge area of the plate is provided with the gas passages by stamping, punching, cutting or the like. Optionally, the edge area can be eroded with the gas passages in a process step during compression.

Also, it is possible to provide the edge area of the plate with further structures, for example by stamping stiffening structures and/or connecting structures for example with the electrolyte layer and/or the contact plate.

Finally, the electrochemically active cell layers are applied, i.e. normally the anode to the substrate area of the plate, the electrolyte to the anode and the cathode to the electrolyte. The anode can be formed for example by a cermet, for example comprising nickel and yttrium-stabilized zirconium oxide. The electrolyte layer is gastight and can consist for example of yttrium-stabilized zirconium oxide or another oxygen-ion-conducting ceramic. The cathode consists of an electronically, or electronically and ionically, conductive ceramic, for example lanthanum strontium cobalt iron oxide.

Between the electrolyte layer and the cathode there can be provided a ceramic diffusion barrier layer, for example comprising cerium gadolinium oxide. Further, there can be provided a diffusion barrier also between the substrate (FeCr alloy) and the nickel-containing anode.

Coating with the electrochemically active cell layers can be effected by wet-chemical coating, for example screen printing, or wet powder spraying with subsequent sintering or by thermal spraying processes, for example high-speed flame spraying or plasma spraying.

To seal the cathode-side oxidant space from the opposing fuel gas space of the plate, the gastight electrolyte layer must seal at least a part of the compressed edge area of the plate. To achieve better adhesion of the electrolyte layer on the compressed edge area, the edge area is preferably roughened before coating, for example by a sandblasting process.

As an alternative to the direct coating of the substrate area of the one-pieced plate produced by powder metallurgy with a compressed edge area, the edge area can first be connected to one or more metallic components, for example the contact plate, before the coating with the electrochemically active cell layers is effected.

The inventive fuel cell or SOFC with a one-pieced plate having a porous central area as a substrate for the electrochemically active cell layers and a compressed gastight edge area with the gas passages and optionally further structures offers considerable advantages and, above all, cost savings. Thus, omitting the weld seam between the porous substrate body and the sheet metal frame substantially reduces the production costs. At the same time, a considerable material saving is attained. Further, the manufacturing of said one-part plate has the advantage that no connection of microstructurally, much less chemically, different materials is carried out. In addition, there is no danger of leaks due to cracks or pores in the weld seam. Depending on the construction of the stack, the one-pieced plate additionally offers the possibility of reducing the overall height per cell, because the side, facing the electrochemically active cell layers, of the porous substrate area in the middle of the plate is located at least at a level with the compressed edge of the plate, while according to the prior art, for example EP 1 278 259 A2, the edge area of the substrate rests on the sheet metal frame.

Figure 2:
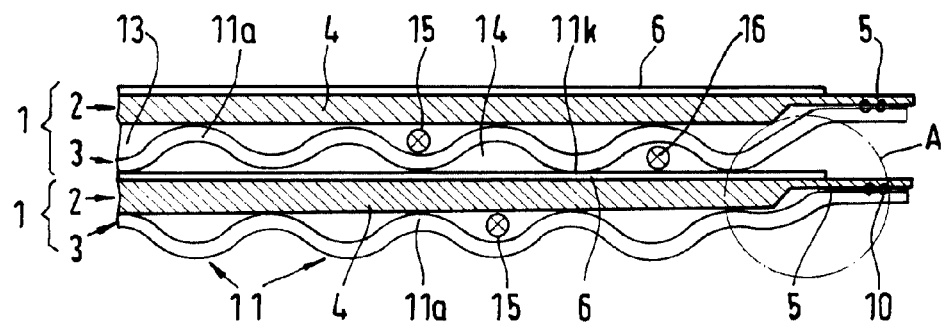
Figure 3:
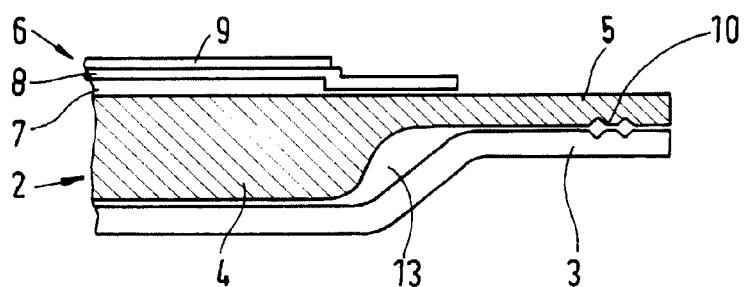
Figure 4:
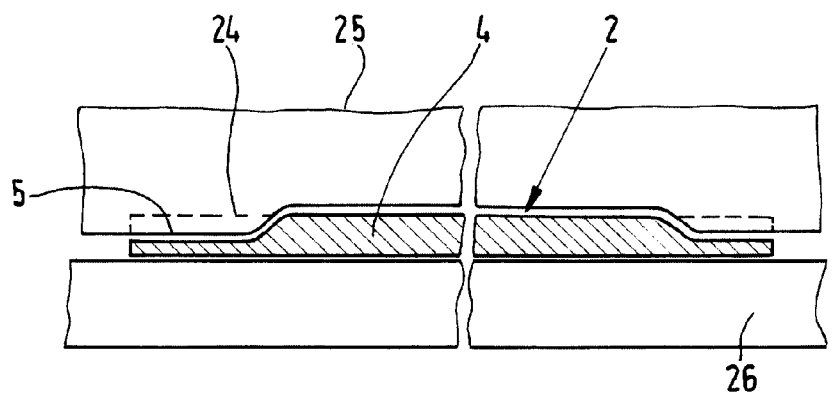

Hereinafter an embodiment of the inventive fuel cell will be explained more closely by way of example with reference to the drawing. Therein are shown:

FIG. 1 a perspective exploded representation of two fuel cells of a fuel cell stack:

FIG. 2 a section along the line II-II through the right-hand part of the two fuel cells according to FIG. 1 in an enlarged representation, FIG. 3 an enlarged representation of the area A of FIG. 2, and FIG. 4 an enlarged partial representation of a front view of the porous body upon pressing into a plate with a central, porous substrate area and compressed edge areas.

According to FIGS. 1 to 3, each cell (1) consists of a powder-metallurgical plate (2) and a contact plate (interconnector) (3).

The powder-metallurgical plate (2) is configured in one piece and has in the central area a porous substrate area (4) and a compressed gastight edge area (5), the porous substrate area (4) being indicated by dashed lines in FIG. 1.

The substrate area (4) is provided with the electrochemically active cell layers (6) which consist according to FIG. 3 of an anode layer (7) on the substrate area (4), a gastight electrolyte layer (8) on the anode layer (7), and a cathode layer (9) on the electrolyte layer (8).

The contact plate (3) can be a sheet metal shaped part which is provided with a wave structure, channel structure or knobbed structure (11) or similar projections to form contact portions (11a) which electroconductively contact the powder-metallurgical plate (2) and thus the anode layer (7) of the one fuel cell (1), and a contact portion (11k) in electrical contact with the cathode layer (9) of the neighboring fuel cell (1).

According to FIGS. 2 and 3, the powder-metallurgical plate (2) and the contact plate (3) are connected gastightly on the circumference at (10), for example by welding or soldering. Further, the gastight electrolyte layer (8) extends on the circumference at least over a part of the compressed edge area (5) of the powder-metallurgical plate (2), as to be seen in FIG. 3.

Thus, the space (13) is separated gastightly from the space (14) in which the cathode layer (9) is disposed. The space (13) in which the anode layer (7) is gastightly enclosed constitutes the combustion space. It is supplied the fuel gas in the direction of the arrow (15) shown from the back in FIGS. 2 and 3. The fuel gas can be e.g. hydrogen, methane or another hydrocarbon. In contrast, the space (14) is supplied the oxidant, for example air or oxygen, according to the arrow (16) shown from the back.

On the anode (7) the fuel, e.g. hydrogen, is oxidized and thus there are extracted therefrom electrons with cation formation which are supplied via the contact plate (3) to the cathode (9) of the neighboring cell (1). The oxidant, e.g. oxygen, accepts electrons in the cathode reaction, so that e.g. oxygen anions are formed. The anions formed from the oxidant diffuse through the electrolyte layer (8) and react on the anode side with the cations formed from the fuel gas so as to form waste gas, for example water vapor or carbon dioxide.

According to FIG. 1, the gastight compressed edge area (5) of the powder-metallurgical plate (2) of each cell is provided on each side of the substrate area (4) with a plurality of gas passages (17) or (18). Likewise, the contact plate (interconnector) (3) has gas passages (19) or (20) on the edge area. The gas passages (17) or (18) and the gas passages (19) or (20) of all fuel cells (1) of the stack are flush with each other.

While the fuel gas is supplied to the fuel gas space (13) through the gas passages (17) and (19), the waste gas is removed from the fuel gas space (13) via the gas passages (18) and (20). By seals (22) and (23) on the gas passages (17) and (18) of two neighboring fuel cells (1) the gas passages (17) to (20) are sealed gastightly from the oxidant space (14).

The fuel cells (1) are series-connected via the contact plate (3). That is, current is collected from the uppermost fuel cell and the lowermost fuel cell of the stack.

According to FIG. 4, for producing the powder-metallurgical plate (2) a planar, sintered, porous body (24) is compressed on the edge between a pressing die (25) and a counter die (26) to form the compressed gastight edge area (5) and the intermediate uncompressed, porous substrate area (4).

The pressing die is preferably so configured that upon compression a continuous, stepless transition arises between the compressed substrate area (4) and the edge area (5). In the edge area (5) the gas passages (17, 18) can then be cut or punched on opposing sides of the substrate area (4), whereupon the electrochemically active cell layer (6) is applied to the substrate area (4), namely the electrolyte layer (8) in such a way that it extends with its total circumference onto the edge area (5), as shown in FIG. 3.

The invention claimed is:

1. A solid oxide fuel cell having a one-pieced plate (2) the entirety of which is produced by powder metallurgy, wherein the plate has a central area (4) and an edge area (5) made of the same material, wherein there is a continuous and seamless transition between the edge area (5) and the central area (4), wherein the central area is a porous substrate to which an electrochemically active cell layer (6) is applied, and wherein gas passages (17, 18) are provided in the edge area (5), and wherein the edge area (5) is compressed to be gastight, and wherein a gastight connection is made between the plate (2) and an interconnector (3) along the edge area (5) of the plate and along a circumference of the interconnector, and wherein the composition of one-pieced plate consists of:
   15 to 35 wt % Cr;
   0.01 to 2 wt % of one or more elements selected from the group consisting of Ti, Zr, Hf, Mn, Y, Sc, and rare earth metals;
   0 to 10 wt % of one or more elements selected from the group consisting of Mo and Al;
   0 to 5 wt % of one or more elements selected from the group consisting of Ni, W, Nb, and Ta;
   0.1 to 1 wt % O; and
   balance Fe and impurities, whereby at least one metal of the group Y, Sc, rare earth metals and at least one metal of the group Cr, Ti, Al, Mn can form a mixed oxide.

2. The fuel cell according to claim 1, characterized in that an electrolyte layer (8) of the electrochemically active cell layer (6) borders gastightly on the gastight edge area (5) of the plate (2).

3. The fuel cell according to claim 1 characterized in that the electrochemically active cell layer (6) includes an electrolyte layer (8), wherein at least a portion of the total circumference of the electrolyte layer extends over the compressed edge area (5) of the plate (2).

4. A fuel cell stack comprising a multiplicity of fuel cells (1) according to claim 1.

5. A fuel cell comprising a plate (2) and an interconnector (3);
   wherein the plate (2) is a one-pieced plate produced entirely by powder metallurgy and has a central area (4) and an edge area (5) made of the same material, wherein the central area is a porous substrate to which an electrochemically active cell layer (6) is applied, and wherein gas passages (17, 18) are provided in the edge area (5), and wherein the edge area (5) is compressed to be gastight; and
   wherein a gastight connection is made between the plate (2) and the interconnector (3) along the edge area (5) of the plate and along a circumference of the interconnector; and
   wherein there is a continuous, seamless transition between the edge area (5) and the central area (4), and wherein the composition of one-pieced plate consists of:
   15 to 35 wt % Cr;
   0.01 to 2 wt % of one or more elements selected from the group consisting of Ti, Zr, Hf, Mn, Y, Sc, and rare earth metals;
   0 to 10 wt % of one or more elements selected from the group consisting of Mo and Al;
   0 to 5 wt % of one or more elements selected from the group consisting of Ni, W, Nb, and Ta;
   0.1 to 1 wt % O; and
   balance Fe and impurities, whereby at least one metal of the group Y, Sc, rare earth metals and at least one metal of the group Cr, Ti, Al, Mn can form a mixed oxide.

6. A fuel cell having a one-pieced plate (2), wherein the plate has a central area (4) and an edge area (5), wherein the central area is a porous substrate to which an electrochemically active cell layer (6) is applied, and wherein gas passages (17, 18) are provided in the edge area (5), wherein the edge area (5) is compressed to be gastight, wherein there is a continuous, seamless transition between the edge area (5) and the central area (4), and wherein the one-pieced plate (2) is formed by a powder metallurgy process comprising:
   producing a planar, porous body by powder metallurgy;
   compressing to the point of airtightness the body edge area of the planar, porous body to form the edge area (5) of the one-pieced plate (2), the remainder of the planar, porous body becoming the central area (4) of the one-pieced plate (2); and
   providing gas passages through the edge area (5), and wherein the composition of one-pieced plate consists of:
   15 to 35 wt % Cr;
   0.01 to 2 wt % of one or more elements selected from the group consisting of Ti, Zr, Hf, Mn, Y, Sc, and rare earth metals;
   0 to 10 wt % of one or more elements selected from the group consisting of Mo and Al;
   0 to 5 wt % of one or more elements selected from the group consisting of Ni, W, Nb, and Ta;
   0.1 to 1 wt % O; and balance Fe and impurities, whereby at least one metal of the group Y, Sc, rare earth metals and at least one metal of the group Cr, Ti, Al, Mn can form a mixed oxide.

7. The fuel cell according to claim 6, wherein the planar, porous body is formed from a powder having a particle size of less than 150 µm.

8. The fuel cell according to claim 6, wherein the planar, porous body has a porosity of 20% to 60%.

9. The fuel cell according to claim 6, wherein the compression of the body edge area is effected by uniaxial pressing or rolling.

* * * * *